US012116050B2

(12) United States Patent
Tanaka et al.

(10) Patent No.: US 12,116,050 B2
(45) Date of Patent: Oct. 15, 2024

(54) STEERING DEVICE

(71) Applicant: NABTESCO CORPORATION, Tokyo (JP)

(72) Inventors: Satoshi Tanaka, Cologne (DE); Stefan Kubina, Cologne (DE)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/298,476

(22) Filed: Apr. 11, 2023

(65) Prior Publication Data

US 2023/0303157 A1 Sep. 28, 2023

Related U.S. Application Data

(63) Continuation of application No. 17/722,837, filed on Apr. 18, 2022, now Pat. No. 11,661,104.

(30) Foreign Application Priority Data

Apr. 23, 2021 (JP) ................. 2021-073445

(51) Int. Cl.
*B62D 5/04* (2006.01)
*B62D 6/00* (2006.01)
(Continued)

(52) U.S. Cl.
CPC ............ *B62D 5/0463* (2013.01); *B62D 6/00* (2013.01); *H02K 7/003* (2013.01); *H02K 11/20* (2016.01)

(58) Field of Classification Search
CPC ........ B62D 5/0463; B62D 6/00; H02K 11/20; H02K 7/003
See application file for complete search history.

(56) References Cited

U.S. PATENT DOCUMENTS 9,685,837 B2  6/2017 Park
2016/0036288 A1  2/2016 Yamasaki et al.
(Continued)

FOREIGN PATENT DOCUMENTS

CN   101010595 A  *  8/2007  ............ G01R 1/067
EP   3181430 A2    6/2017
(Continued)

OTHER PUBLICATIONS

Extended European Search Report dated Oct. 11, 2022, issued in corresponding European Patent Application No. 22169018.3 (10 pgs.).

(Continued)

*Primary Examiner* — Jacob D Knutson
(74) *Attorney, Agent, or Firm* — Pillsbury Winthrop Shaw Pittman, LLP

(57) ABSTRACT

A steering device according to one aspect of the disclosure includes: a speed reducer configured to decelerate a rotational power input from one surface side while increasing a torque and output rotation from an output section disposed on the other surface side; a motor provided on the one surface side and configured to input the rotational power to the speed reducer; and a control device for controlling the motor. The motor includes a rotor for generating the rotational power. The rotor includes a rotor output shaft disposed coaxially with an output axis of the output section. The motor inputs the rotational power from one end side of the rotor output shaft to the speed reducer. The control device is disposed on the other end side of the rotor output shaft coaxially with the rotor output shaft and includes a sensing unit for sensing rotation of the rotor.

14 Claims, 8 Drawing Sheets

(51) Int. Cl.
*H02K 7/00* (2006.01)
*H02K 11/20* (2016.01)

(56) References Cited

U.S. PATENT DOCUMENTS

| | | | |
|---|---|---|---|
| 2017/0126104 A1 | 5/2017 | Yamanaka | |
| 2018/0127020 A1 | 5/2018 | Asao et al. | |
| 2018/0219450 A1 | 8/2018 | Yamamoto | |
| 2018/0244303 A1* | 8/2018 | Wilske | B62D 5/0421 |
| 2019/0016371 A1* | 1/2019 | Urimoto | H02K 11/33 |
| 2019/0152519 A1* | 5/2019 | Nakamura | B62D 5/0433 |
| 2019/0162281 A1 | 5/2019 | Nakamura | |
| 2020/0156697 A1 | 5/2020 | Jordan | |
| 2020/0373867 A1 | 11/2020 | Yamashita et al. | |

FOREIGN PATENT DOCUMENTS

| | | | | |
|---|---|---|---|---|
| JP | 2007-001564 A | | 1/2007 | |
| JP | 2007-179853 A | | 7/2007 | |
| JP | 2008-305747 A | | 12/2008 | |
| JP | 2010-225351 A | | 10/2010 | |
| JP | 2017-109599 A | | 6/2017 | |
| JP | 2017128300 A | * 7/2017 | | B62D 3/02 |
| JP | 2019-093864 A | | 6/2019 | |
| JP | 2019-100439 A | | 6/2019 | |
| JP | 2019-156042 A | | 9/2019 | |
| KR | 2017088289 A | * 8/2017 | | B62D 5/0421 |
| WO | 2017/175325 A1 | | 10/2017 | |
| WO | 2018/042657 A1 | | 3/2018 | |
| WO | 2019/138698 A1 | | 7/2019 | |
| WO | 2019/176316 A1 | | 9/2019 | |
| WO | WO-2020039572 A1 | * 2/2020 | | B60R 16/03 |

OTHER PUBLICATIONS

Notice of Reasons for Rejection dated Jun. 8, 2021, issued in corresponding Japanese Patent Application No. 2021-073445 w/English translation (5 pgs.).

Decision of Refusal dated Sep. 7, 2021, issued in corresponding Japanese Patent Application No. 2021-073445 w/English translation (5 pgs.).

Notice of Allowance dated Jan. 11, 2022, issued in corresponding Japanese Patent Application No. 2021-073445 with English translation (6 pgs.).

* cited by examiner

STEERING DEVICE

CROSS-REFERENCE TO RELATED APPLICATIONS

This application is a Continuation Application of U.S. Ser. No. 17/722,837, filed Apr. 18, 2022, which is based on and claims the benefit of priority from Japanese Patent Application Serial No. 2021-073445, filed Apr. 23, 2021, the contents of each of which are hereby incorporated by reference in their entirety.

TECHNICAL FIELD

The present disclosure relates to a steering device.

BACKGROUND

A steering device installed in a vehicle or the like receives rotation input in accordance with operation of a steering wheel or the like and outputs rotation via a speed reducer. In recent years, studies are conducted on steering devices having steer-by-wire configuration instead of being connected to a steering shaft coupled to a steering wheel. In the steer-by-wire configuration, a motor controls steering in accordance with the operation angle of the steering wheel.

A steering device preferably has such a small size as not to be constrained by the shape of an object to which it is mounted. For example, U.S. Patent Application Publication No. 2020/0156697 ("the '697 Publication") discloses a steering device in which an assisting force is provided in steering directions to reduce the load of operation. The steering device disclosed in the '697 Publication includes: an input shaft having a worm wheel and configured to receive rotation based on operation; and an assistance power unit having a worm shaft meshing with the worm wheel and configured to provide an assisting force in the rotational direction of the input shaft.

In the steering device disclosed in the '697 Publication, the worm shaft and the worm wheel have rotational axes orthogonal to each other. This may result in large-sized device configuration of the object to which the steering device is mounted.

SUMMARY

One object of the present disclosure is to provide a steering device with downsized device configuration.

(1) A steering device according to one aspect of the disclosure comprises: a speed reducer configured to decelerate a rotational power input from one surface side while increasing a torque of the rotational power and output rotation from an output section disposed on the other surface side; a motor provided on the one surface side and configured to input the rotational power to the speed reducer; and a control device for controlling the motor. The motor includes a rotor for generating the rotational power. The rotor includes a rotor output shaft disposed coaxially with an output axis of the output section. The motor inputs the rotational power from one end side of the rotor output shaft to the speed reducer. The control device is disposed on the other end side of the rotor output shaft coaxially with the rotor output shaft and includes a sensing unit for sensing rotation of the rotor.

(2) The output section may have an arm provided thereon that is configured to rotate about the output axis in a circumferential direction of the output section.
(3) The one end side of the rotor output shaft may have a gear integrated therewith that serves to input the rotational power to the speed reducer.
(4) The control device may include: an inverter circuit configured to generate an electric current for controlling the motor; and a coupling connector electrically connecting between the inverter circuit and the motor. The coupling connector may be disposed at a position corresponding to the inverter circuit and disposed adjacent to the motor.
(5) The control device may include a first control device and a second control device for controlling the motor. The first control device and the second control device may be arranged in point symmetry as viewed from a direction along the rotor output shaft.
(6) Each of the first control device and the second control device may include a projection projecting radially outward from the motor as viewed from the direction along the rotor output shaft. A portion of each of the projections facing the motor may have a connector provided thereon that is electrically connected with another device.
(7) The connectors may include at least power supply connectors for supplying electric power to the motor. The power supply connectors may be provided on the projection of the first control device and the projection of the second control device and may be spaced apart from each other.
(8) An angle sensing unit for sensing a rotational angle of the arm may be provided between the arm and the motor.
(9) The angle sensing unit may extend along the circumferential direction of the output section.
(10) The speed reducer may include a rotation sensing unit for sensing rotation of a crankshaft that receives the rotational power input from the rotor output shaft. The control device may adjust a rotational angle of the arm based on a rotation sensing value obtained by the rotation sensing unit and a reduction ratio of the speed reducer.
(11) The control device may adjust a rotational angle of the arm based on a sensing value obtained by the sensing unit and a reduction ratio of the speed reducer.
(12) The control device may include a first control device and a second control device for controlling the motor. The motor may include a first three-phase coil unit controlled by the first control device and a second three-phase coil unit controlled by the second control device.
(13) The first control device may include a first switching unit for controlling connection at a first connection unit at which terminals of the first three-phase coil unit are connected. The second control device may include a second switching unit for controlling connection at a second connection unit at which terminals of the second three-phase coil unit are connected.
(14) A steering device according to one aspect of the disclosure comprises: a speed reducer configured to decelerate a rotational power input from one surface side while increasing a torque of the rotational power and output rotation from an output section disposed on the other surface side; a motor provided on the one surface side and configured to input the rotational power to the speed reducer; a control device for controlling the motor; and an arm provided on the output section. The motor includes a rotor for generating the rotational power. The rotor includes a rotor output shaft disposed coaxially with an output axis of the output section. The motor inputs the rotational power from one end side of the rotor output shaft to the speed reducer. The control device is disposed on the other end side of the rotor output shaft coaxially with the rotor output shaft and includes a sensing unit for sensing rotation of the rotor. The arm is configured to rotate about the output axis in a circumferential direction of the output section. The speed reducer includes: a plurality of spur gears configured to rotate by the rotational power input from the one end side of the rotor output shaft; a plurality of shafts each coupled to corresponding one of the plurality of spur gears; a plurality of eccentric cams each formed on corresponding one of the plurality of shafts; and an eccentric gear configured to rotate eccentrically relative to a central axis of the output section in accordance with rotation of the plurality of eccentric cams. The eccentric gear rotates eccentrically about the central axis along an inner peripheral surface of the output section. The output section outputs rotation with a reduced rotational speed compared to that of the plurality of spur gears.

According to the present disclosure, the configuration of the steering device can be downsized.

DESCRIPTION OF THE EMBODIMENTS

Figure 1:
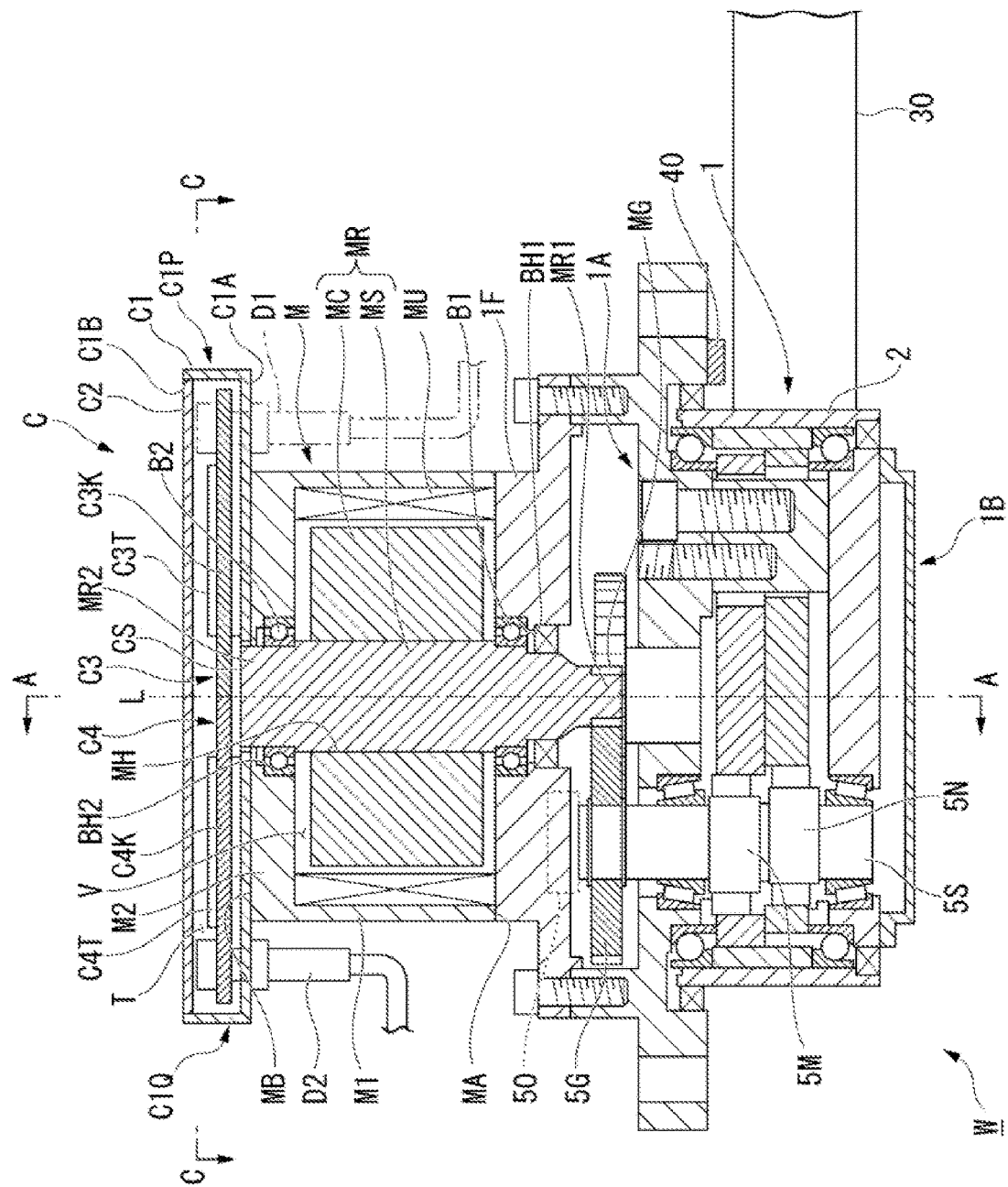
FIG. 1 is a sectional view of a steering device according to an embodiment of the disclosure, as viewed along the line E-E in FIG. 5.

As shown in FIG. 1, a steering device W includes: a speed reducer 1; a motor M disposed on the first surface 1A side of the speed reducer 1; and a control device C provided on the motor M. The steering device W is a steer-by-wire device, in which a sensor senses operation information and instruction information of a vehicle body, and based on the sensing values of the sensor, the control device C causes the motor M to input to the speed reducer 1 a rotational power for producing a steering angle in accordance with the amount of operation. The operation information is output in accordance with the amount of operation of devices for inputting operation such as a steering wheel or a lever. The instruction information of the vehicle body is output from a vehicle stability control device, automated driving device or the like. The steering device W is applicable to steering of a front wheel of a vehicle, and it is also applicable to steering of a rear wheel. The steering device W is applicable to a commercial truck or a combination vehicle having three or more axles. The steering device W is applicable to a passenger car.

In the steering device W, for example, the speed reducer 1, the motor M, and the control device C are centered at the central axis L that is aligned with the output axis of the speed reducer 1. Therefore, the steering device W can have a smaller width along the central axis L direction than in conventional arts, such that its size can be small. The control device C controls the motor M based on the rotational angle of the rotational driving force applied in the operation.

The speed reducer 1 decelerates the rotational power input from the motor M to increase the torque and outputs the rotational output. The speed reducer 1 includes an output section 2 having a cylindrical shape, for example. The output section 2 is configured to output the rotational output. The speed reducer 1 will be described in detail later. The rotational power of the motor M is input to the first surface (one surface) 1A side of the speed reducer 1 in the central axis L direction. The rotational output is output to the second surface (the other surface) 1B side of the speed reducer 1 in the central axis L direction. The central axis L is aligned with the output axis of the speed reducer 1. Hereinafter, the direction around the central axis L is referred to as the circumferential direction, and the direction orthogonal to the central axis L is referred to as the radial direction.

On the first surface 1A side of the speed reducer 1, there is provided a fixing member 1F to be fixed to an object to which the steering device W is mounted. On the second surface 1B side of the speed reducer 1, the output section 2 having a cylindrical shape is provided. The output section 2 is configured to rotate relative to the fixing member 1F and output the rotational output. The output section 2 has provided thereon an arm 30 that is configured to rotate around the central axis L (output axis) and disposed to project in the radial direction. The arm 30 is connected to, for example, a steering unit (not shown) of the vehicle for steering of the wheel in accordance with the rotational operation. The arm 30 and the output section 2 may be either formed of separate members or formed of a single member. The arm 30 is provided to rotate in the circumferential direction around the output section 2. Thus, the steering device W can have a small width along the central axis L direction, such that its size can be small.

The fixing member 1F has a first surface to which the speed reducer 1 is connected. The fixing member 1F has a second surface (the surface opposite to the first surface) to which a first end MA of the motor M is fixed. The control device C is connected to a second end MB of the motor M. The motor M is, for example, a brushless motor controlled by the control device C. The motor M may also be a brush motor.

The motor M produces a rotational power in the rotational direction according to the steering wheel operation. The motor M has a motor casing M1 having a cylindrical shape, for example. The motor casing M1 is disposed coaxially with the central axis L.

On the second end MB of the motor M, there is provided a lid portion M2 having a disc-like shape and closing a circular opening in the motor casing M1. The lid portion M2 is, for example, integrated with the motor casing M1. The lid portion M2 may also be separate from the motor casing M1. The lid portion M2 is disposed coaxially with the central axis L. The lid portion M2 has a second bearing holding space BH2 formed in the inner side thereof and recessed in an annular shape. The second bearing holding space BH2 is disposed coaxially with the central axis L. A second bearing B2 is fitted in the second bearing holding space BH2.

At the first end MA of the motor M, the circular opening in the motor casing M1 is closed by the fixing member 1F. The portion of the fixing member 1F facing the motor M has a first bearing holding space BH1 recessed in an annular shape. A first bearing B1 is fitted in the first bearing holding space BH1. At the first end MA of the motor M, for example, the fixing member 1F is integrated with the motor casing M1. The fixing member 1F may be integrated with the output section 2 of the speed reducer 1. Further, the fixing member 1F may be formed separately from the motor M and the speed reducer 1. The motor casing M1 contains a rotor housing space V enclosed by the motor casing M1, the lid portion M2, and the fixing member 1F.

The rotor housing space V contains a coil unit MU for generating a magnetic field. The coil unit MU includes a plurality of coils. The magnetic field generated by the plurality of coils is controlled by the control device C, for example. The plurality of coils are arranged, for example, along the inner peripheral surface of the motor casing M1 coaxially with the central axis L. In other words, the motor M is configured as a radial gap motor. The motor M is not limited to this configuration. For example, the motor M may be configured as an axial gap motor having a plurality of coils arranged in the rotor axis direction.

Inside the coil unit MU, there is disposed a rotor MR that rotates based on the magnetic field generated from the coil unit MU. The rotor MR generates the rotational power of the motor M. The rotor MR is disposed coaxially with the central axis L.

The rotor MR includes: for example, a rotor output shaft MS for outputting the rotational power of the rotor MR; and a rotor body MC fixed to the rotor output shaft MS. The rotor body MC is formed of, for example, a permanent magnet and has a cylindrical shape. The rotor body MC is disposed coaxially with the central axis L of the output section 2. The rotor body MC has a through-hole MH formed along the central axis L.

The through-hole MH is penetrated by the rotor output shaft MS along the central axis L direction. The rotor output shaft MS has a cylindrical shape, for example. The rotor output shaft MS is disposed coaxially with the central axis L. The rotor output shaft MS is bonded to the through-hole MH, for example. The rotor output shaft MS may be fitted in the through-hole MH.

A first end (one end) MR1 of the rotor output shaft MS is rotatably supported by the first bearing B1. A second end (the other end) MR2 of the rotor output shaft MS is rotatably supported by the second bearing B2. The first end MR1 of the rotor output shaft MS has a gear MG integrated therewith. The gear MS serves to input the rotational power to the speed reducer 1.

The gear MG is exposed from the fixing member 1F toward the speed reducer 1. The gear MG is a spur gear with spur teeth formed on its outer circumference. The gear MG is meshed with a spur gear 5G (described later) provided in the speed reducer 1. With the above configuration, the motor M can rotate the rotor MR in a direction for increasing the rotational power input to the spur gear 5G of the speed reducer 1, so as to input a rotation assisting force to the speed reducer 1. The first surface 1A of the speed reducer 1 is fixed to the fixing member 1F. The speed reducer 1 reduces the number of rotations and increases the torque as compared to the rotational power input thereto, and outputs the rotational force around the rotational axis from the output section 2. The rotational axis of the speed reducer 1 is aligned with the central axis L. The arm 30 is connected to the speed reducer 1. Therefore, the arm 30 rotates about the rotational axis by the rotational force output by the speed reducer 1.

The gear MG is integrated with the rotor output shaft MS. Therefore, the steering device W can have a smaller width along the central axis L direction than in the configuration in which a separate gear is mounted to the rotor output shaft MS. The gear MG is meshed with the spur gear 5G provided on the first surface 1A side of the speed reducer 1 and inputs the rotational power to the speed reducer 1.

Figure 2:
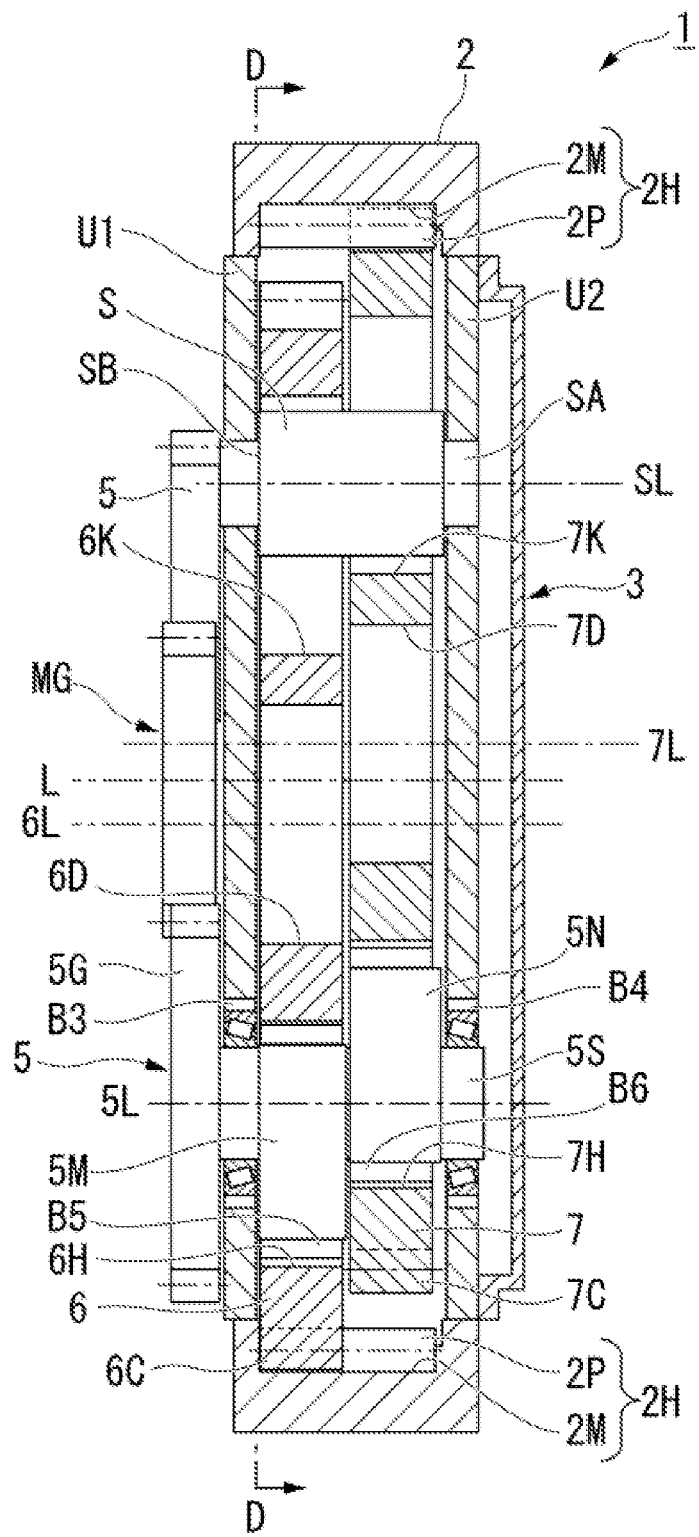
FIG. 2 is a sectional view of a speed reducer along the line A-A in FIG. 1.
Figure 3:
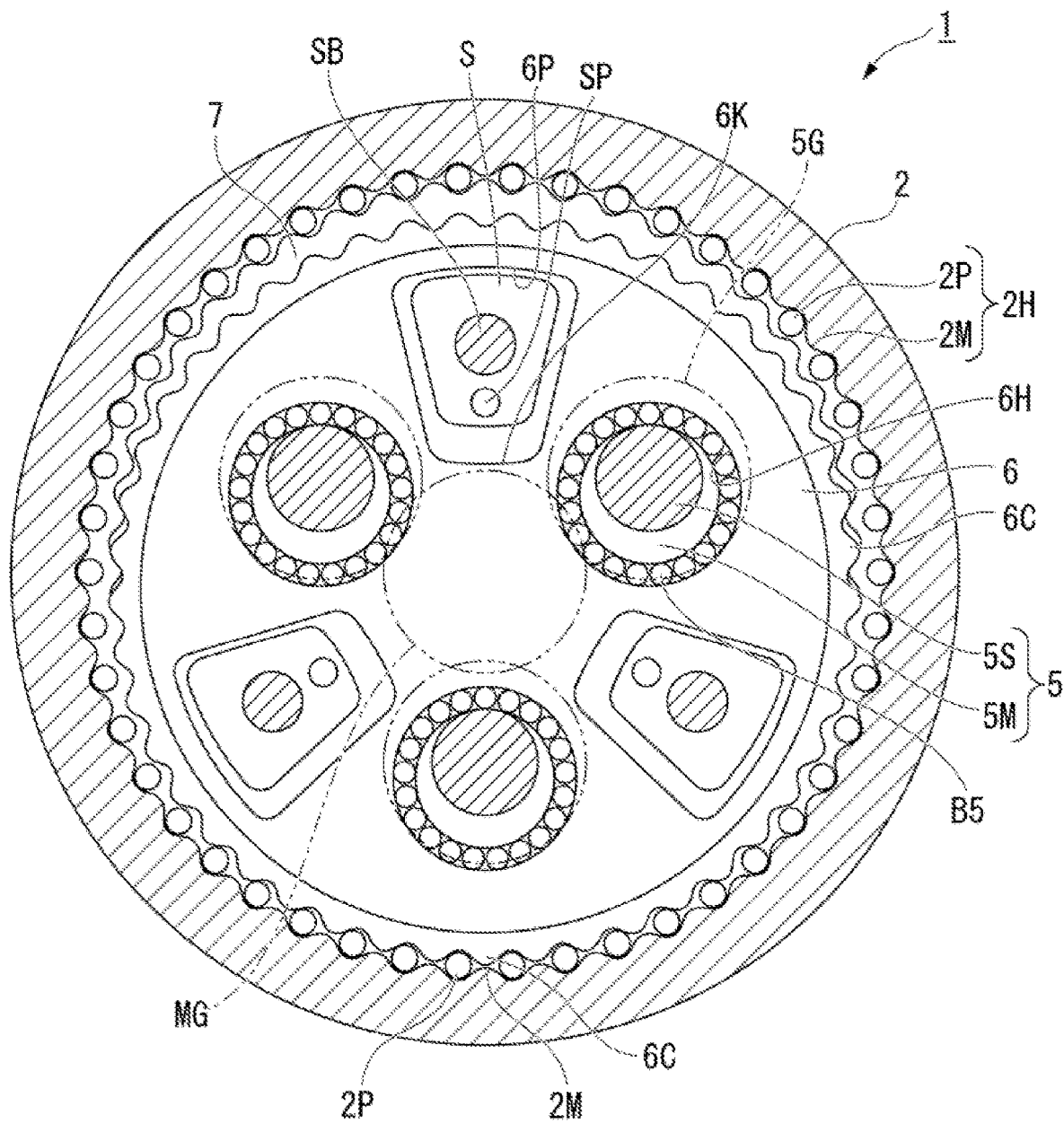
FIG. 3 is a sectional view of the speed reducer along the line D-D in FIG. 2.

As shown in FIGS. 2 and 3, the speed reducer 1 is an eccentric differential speed reducer including a pin gear as internal teeth and including trochoidal gears as external teeth. The speed reducer 1 includes the output section 2 having a cylindrical shape and a reduction mechanism 3 provided in the output section 2. The inner peripheral surface of the output section 2 has internal teeth 2H formed thereon. The internal teeth 2H are formed of a plurality of pins 2P shaped like a circular column and pin grooves 2M supporting the plurality of pins 2P. As viewed from the central axis direction of the output section 2, the plurality of pin grooves 2M have a substantially semicircular section and are arranged along the inner peripheral surface of the output section 2.

The pin grooves 2M extend along the central axis L in the inner peripheral surface of the output section 2. Each of the pins 2P is in contact with associated one of the pin grooves 2M along the axial direction. As viewed from the direction of the central axis L of the output section 2, the plurality of pins 2P are disposed in the plurality of pin grooves 2M arranged along the inner peripheral surface of the output section 2. With this configuration, as viewed from the direction of the central axis L, the internal teeth 2H are formed of the plurality of pins 2P arranged on the inner peripheral surface of the output section 2.

On the first surface side of the reduction mechanism 3, there are three gears 5 arranged at regular intervals around the central axis L. The number of the gears 5 is not limited to three but may be, for example, two or larger than three. The gear MG is located at the center of the three gears 5 so as to mesh with the three gears 5. Therefore, the three gears 5 rotate in conjunction with the rotation of the gear MG.

Each of the gears 5 includes, for example, the spur gear 5G meshing with the gear MG, a shaft 5S coupled coaxially with the spur gear 5G, and a first eccentric cam 5M and a second eccentric cam 5N formed on the shaft 5S.

The three spur gears 5G mesh with the gear MG (see FIG. 1). Thus, the three spur gears 5G receive the rotation assisting force from the motor M in the direction for increasing the rotational power. This causes the shafts 5S to rotate.

Each of the shafts 5S is shaped like a circular column. A first end of the shaft 5S is rotatably supported on a second disc U2 via a bearing B4. A second end of the shaft 5S is rotatably supported on a first disc U1 via a bearing B3.

The second end of the shaft 5S and the spur gear 5G are coupled together coaxially with the axis 5L (rotational axis) of the shaft 5S. The spur gear 5G is formed in, for example, a circular disc shape having a predetermined number of spur teeth. Therefore, when the spur gear 5G is rotationally driven by the gear MG, the shaft 5S rotates in conjunction with the rotation of the spur gear 5G. The shaft 5S has the first eccentric cam 5M and the second eccentric cam 5N formed integrally therewith. The first eccentric cam 5M and the second eccentric cam 5N are shaped like a circular column, for example. The first eccentric cam 5M is formed eccentrically such that its central axis is off the axis 5L of the shaft 5S.

The second eccentric cam 5N is formed eccentrically such that its central axis is off the axis 5L of the shaft 5S. The direction of eccentricity of the second eccentric cam 5N is opposite to that of the first eccentric cam 5M. The first eccentric cam 5M and the second eccentric cam 5N rotate in conjunction with the shaft 5S coupled to the spur gear 5G. The first eccentric cam 5M drives a first eccentric gear 6 disposed in the output section 2.

The first eccentric gear 6 is shaped like a disc. The first eccentric gear 6 has a circular through-hole 6D formed around the central axis 6L of the first eccentric gear 6. The through-hole 6D is not essential and may not be provided.

The first eccentric gear 6 has external teeth 6C formed along its outer peripheral edge. A part of the external teeth 6C mesh with the internal teeth 2H formed along the inner peripheral surface of the output section 2. For example, the number of the external teeth 6C is smaller than that of the internal teeth 2H by one or more. The first eccentric gear 6 rotates eccentrically relative to the central axis L (rotational axis). The first eccentric gear 6 does not slide but rolls along the inner peripheral surface of the output section 2, with a part of the external teeth 6C meshing with the internal teeth 2H, and thus the first eccentric gear 6 rotates eccentrically.

The first eccentric gear 6 has, for example, three first through-holes 6H that rotatably support three first eccentric cams 5M, respectively. Each of the first through-holes 6H has a circular opening. Each of the first eccentric cam 5M is rotatably supported in the first through-hole 6H via a needle bearing B5. The first eccentric gear 6 has three second through-holes 6K disposed between the three first through-holes 6H. The number of the second through-holes 6K is determined in accordance with the number of the first through-holes 6H. For example, three or more second through-holes 6K may be provided.

As viewed from the direction of the central axis 6L of the first eccentric gear 6, for example, the three second through-holes 6K are arranged symmetrically around the central axis 6L. Each of the second through-holes 6K has a thin portion 6P formed of a region having a smallest thickness between the second through-hole 6K and the external teeth 6C. The second eccentric cam 5N drives a second eccentric gear 7 disposed in the output section 2. The second eccentric gear 7 is shaped like a disc.

The second eccentric gear 7 has a circular through-hole 7D formed around the central axis 7L of the second eccentric gear 7. The through-hole 7D is not essential and may not be provided. The second eccentric gear 7 has external teeth 7C formed along its outer peripheral edge. A part of the external teeth 7C mesh with the internal teeth 2H formed along the inner peripheral surface of the output section 2. For example, the number of the external teeth 7C is smaller than that of the internal teeth 2H by one or more. The second eccentric gear 7 rotates eccentrically relative to the central axis L (rotational axis).

The second eccentric gear 7 does not slide but rolls along the inner peripheral surface of the output section 2, with a part of the external teeth 7C meshing with the internal teeth 2H, and thus the second eccentric gear 7 rotates eccentrically. The second eccentric gear 7 rotates in conjunction with the first eccentric gear 6, and it rotates eccentrically with its direction of eccentricity being opposite to that of the first eccentric gear 6. Since the second eccentric gear 7 and the first eccentric gear 6 rotate in conjunction with each other, the rotational balance of the speed reducer 1 is maintained.

The second eccentric gear 7 has, for example, three first through-holes 7H that rotatably support three second eccentric cams 5N, respectively. Each of the first through-holes 7H has a circular opening. Each of the second eccentric cam 5N is rotatably supported in the first through-hole 7H via a needle bearing B6. The second eccentric gear 7 has three second through-holes 7K disposed between the three first through-holes 7H. The number of the second through-holes 7K is determined in accordance with the number of the first through-holes 7H. For example, three or more second through-holes 7K may be provided.

As viewed from the direction of the central axis 7L of the second eccentric gear 7, for example, the three second through-holes 7K are arranged symmetrically around the central axis 7L. Each of the second through-holes 7K has a thin portion (not shown) formed of a region having a smallest thickness between the second through-hole 7K and the external teeth 7C.

The second through-holes 6K, 7K are penetrated by coupling shafts S in a continuous manner. Respective first ends SA of the coupling shafts S are coupled to the second disc U2 that rotatably supports the first ends of the three shafts 5S via the bearings. Respective second ends SB of the coupling shafts S are coupled to the first disc U1 that rotatably supports the second ends of the three shafts 5S via the bearings. Three coupling shafts S are provided to correspond to the number of the three second through-holes 6K, 7K.

The first end SA of each of the coupling shafts S projects from the second through-holes 6K, 7K toward the second disc U2. The first end SA and the second end SB of the coupling shaft S have a circular section as viewed from the direction of the axis SL. The first end SA of the coupling shaft S is supported on the second disc U2. The second end SB of the coupling shaft S is supported on the first disc U1.

As viewed in the direction of the axis SL, the second end SB of the coupling shaft S is positioned on the first disc U1 by a pin SP. It is also possible that, as viewed in the direction of the axis SL, the first end SA of the coupling shaft S is positioned on the second disc U2 by a pin SP. The coupling shaft S is fixed to, for example, the fixing member 1F via the first disc U1. With this configuration, the first disc U1, the coupling shafts S, and the second disc U2 are fixed to the fixing member 1F. The output section 2 rotates relative to the first disc U1, the coupling shafts S, and the second disc U2. The output section 2 reduces the number of rotations and increases the torque as compared to the rotational power input to the spur gear 5G, and outputs the rotational force around the central axis L (rotational axis).

The arm 30 connected to the output section 2 rotates about the central axis L (rotational axis) in conjunction with the rotation of the output section 2. The arm 30 is, for example, formed in a rod shape. A proximal end of the arm 30 is connected to, for example, the outer periphery of the output section 2. The arm 30 is coupled to the speed reducer 1 such that the arm 30 is rotatable about the central axis L.

For example, a ball joint (not shown) is provided on a distal end of the arm 30. The distal end of the arm 30 is connected to a steering mechanism (not shown). The connecting position of the arm 30 to the output section 2 is not limited to that in the embodiment. The arm 30 may be connected at any position around the central axis L (rotational axis), for example, depending on the position of the object connected to the distal end of the arm 30. With this configuration, the arm 30 is rotatable in the circumferential direction of the output section 2 of the speed reducer 1 with no limitation of the rotation range. Thus, the arm 30 can be connected to the output section 2 of the speed reducer 1 at any position in the circumferential direction of the output section 2.

Next, a description is given of the control device C.

Figure 4:
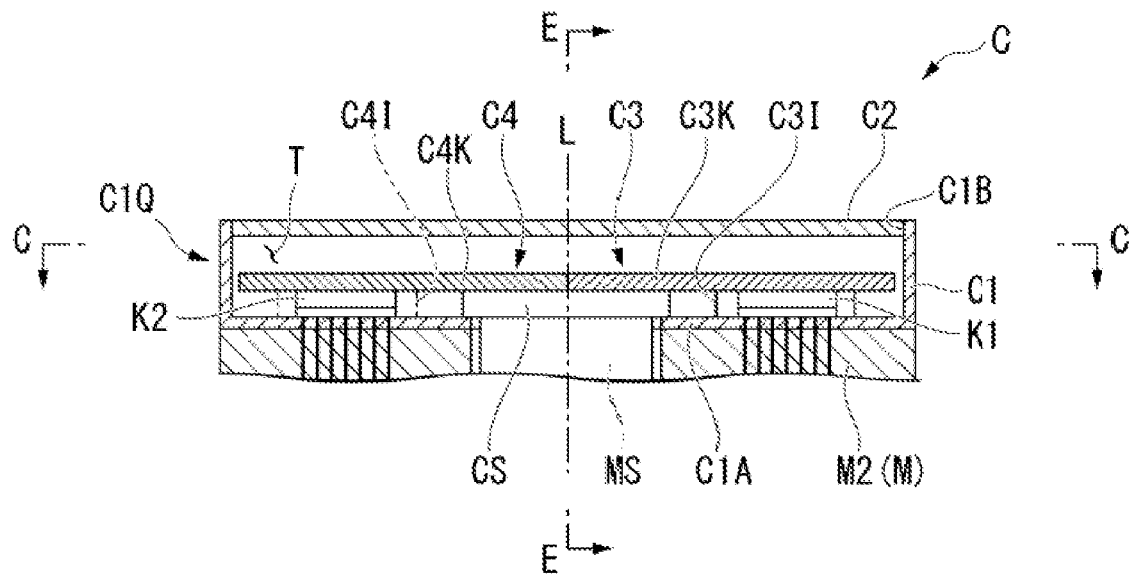
FIG. 4 is a sectional view of a control device along the line A-A in FIG. 1.
Figure 5:
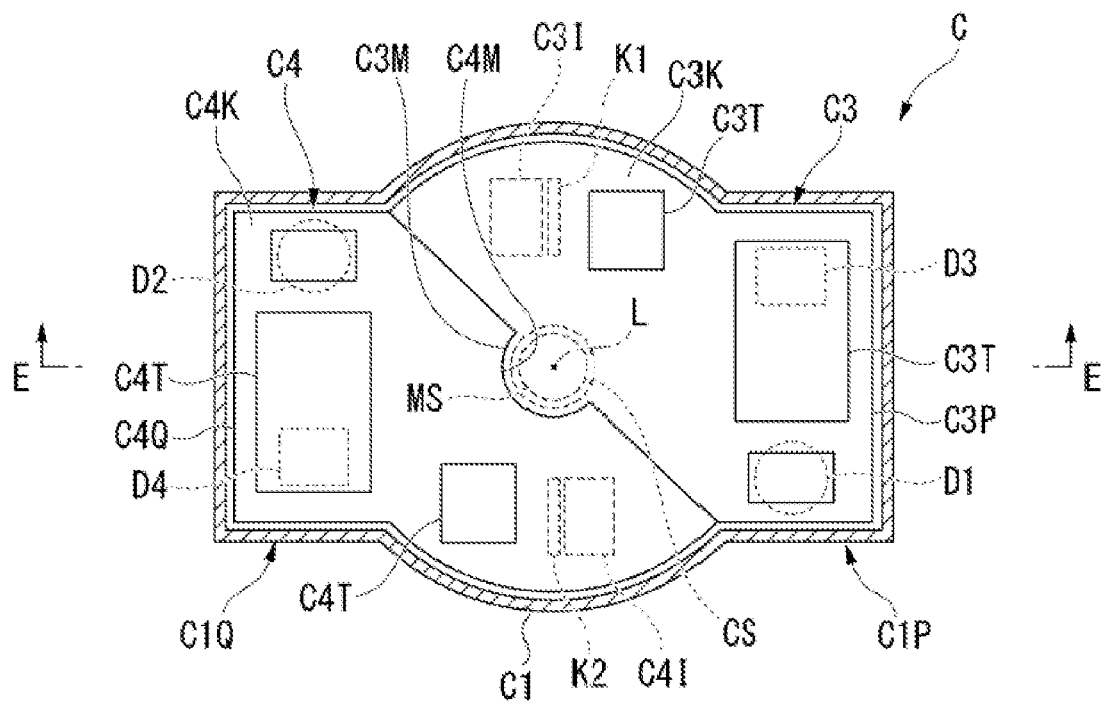
FIG. 5 is a sectional view along the line C-C in FIG. 1, schematically showing internal configuration of the control device in FIG. 1.

As shown in FIGS. 4 and 5, the control device C is disposed, for example, on the second end MR2 side of the rotor output shaft MS. For example, the control device C is disposed coaxially with the central axis L. The control device C includes, for example, a cylindrical casing C1 formed in accordance with the outer diameter of the motor casing M1. The casing C1 includes, for example, a pair of projections C1P, C1Q projecting radially outward from the outer diameter of the motor casing M1, as viewed in the direction of the central axis L. The control device C is not limited to such an outer shape but may have any shape.

A bottom surface C1A of the casing C1 is connected to the lid portion M2 of the motor M. A top surface C1B of the casing opposite to the bottom surface C1A has a rectangular opening C1B. The opening C1B is closed by a lid portion C2 shaped like a rectangular disc. The lid portion C2 is, for example, fixed to the casing C1 with a screw or the like. The lid portion C2 may be fitted in the opening C1B and retained by pawls or the like provided along the periphery of the opening C1B. The control device C contains a housing space T enclosed by the casing C1 and the lid portion C2.

The housing space T contains a sensing unit CS disposed at a position corresponding to the second end MR2 of the rotor output shaft MS. The sensing unit CS is a sensor for sensing the rotation of the rotor MR. Based on the sensing value of the sensing unit CS, the control device C controls the electric power supplied to the coil unit MU to control the rotation of the rotor MR. The sensing unit CS is disposed coaxially with the central axis L.

The housing space T contains a first control device C3 and a second control device C4 for controlling the motor M. The first control device C3 and the second control device C4 have the same circuit configuration. The first control device C3 and the second control device C4 are provided for redundancy, such that the motor M can be controlled if any one of them malfunctions. Therefore, the second control device C4 may not be provided. The control device C includes at least the first control device C3.

The first control device C3 includes a first board C3K having a first circuit C3T provided thereon. The first board C3K is, for example, screwed to the casing C1. The first board C3K has, for example, a first surface facing the lid portion C2 and a second surface facing the bottom surface C1A. The first circuit C3T is provided on the first surface of the first board C3K.

The second control device C4 includes a second board C4K having a second circuit C4T provided thereon. The second board C4K is, for example, screwed to the casing C1. The second board C4K has, for example, a first surface facing the lid portion C2 and a second surface facing the bottom surface C1A. The second circuit C4T is provided on the first surface of the second board C4K.

The first circuit C3T includes a first inverter circuit C31 for generating an electric current for controlling the motor M. The first inverter circuit C31 is, for example, disposed on the second surface of the first board C3K at a position corresponding to the lid portion M2 of the motor M. The first inverter circuit C31 is, for example, in contact with the bottom surface C1A of the casing C1. The contact surface between the first inverter circuit C31 and the bottom surface C1A may be provided with a filler having a high heat conductivity. Thus, the heat generated in the first inverter circuit C31 can be transmitted to the bottom surface C1A. The heat transmitted to the bottom surface C1A is also transmitted through the lid portion M2 of the motor M to the motor casing M1 and radiated from the surface of the motor casing M1.

The casing C1 and the motor casing M1 are formed of, for example, metal members having a high heat conductivity such as aluminum. The surfaces of the casing C1 and the motor casing M1 may have formed thereon a heat sink having a plurality of projections or a heat radiation layer formed of another member having a high heat conductivity. On the second surface of the first board C3K, there is provided a first coupling connector K1 for electrically connecting between the first inverter circuit C31 and the motor M. The first coupling connector K1 is disposed on the second surface of the first board C3K at a position adjacent to the first inverter circuit C31 and adjacent to the lid portion M2 of the motor M.

The first coupling connector K1 includes an electrode terminal (not shown) and connects between the first inverter circuit C31 and the motor M by the electrically shortest distance. The first coupling connector K1 is formed of, for example, an insulator such as a resin. The first coupling connector K1 detachably fixes the first inverter circuit C31 and the motor M. The first coupling connector K1 may be formed as a part of a support structure supporting the first board C3K to the casing C1. In this case, poor contact can be prevented by configuring the support structure such that no load is applied to the electrode terminal of the first coupling connector K1.

The second circuit C4T includes a second inverter circuit C4I for generating an electric current for controlling the motor M. The second inverter circuit C4I is, for example, disposed on the second surface of the second board C4K at a position corresponding to the lid portion M2 of the motor M. The second inverter circuit C4I is, for example, in contact with the bottom surface C1A of the casing C1. A filler having a high heat conductivity may be provided between the second inverter circuit C4I and the bottom surface C1A. Thus, the heat generated in the second inverter circuit C4I can be transmitted to the bottom surface C1A.

The heat transmitted to the bottom surface C1A is also transmitted through the lid portion M2 of the motor M to the motor casing M1 and radiated from the surface of the motor casing M1. On the second surface of the second board C4K, there is provided a second coupling connector K2 for electrically connecting between the second inverter circuit C4I and the motor M. The second coupling connector K2 is disposed on the second surface of the second board C4K at a position adjacent to the second inverter circuit C4I and adjacent to the lid portion M2 of the motor M.

The second coupling connector K2 includes an electrode terminal (not shown) and connects between the second inverter circuit C4I and the motor M by the electrically shortest distance. The second coupling connector K2 is formed of, for example, an insulator such as a resin. The second coupling connector K2 detachably fixes the second inverter circuit C4I and the motor M side. The second coupling connector K2 may be formed as a part of a support structure supporting the second board C4K to the casing C1 side. In this case, poor contact can be prevented by configuring the support structure such that no load is applied to the electrode terminal of the second coupling connector K2.

Since the housing space T contains the first coupling connector K1 and the second coupling connector K2, the control device C can have a smaller width along the direction of the central axis L. In the control device C, the presence of the first coupling connector K1 and the second coupling connector K2 makes it possible to connect the first inverter circuit C3I and the second inverter circuit C4I with the motor M by the electrically shortest distance. As a result, electric noise can be reduced. Further, since the first coupling connector K1 and the second coupling connector K2 are connected with the motor M by the electrically shortest distance, the effects of other input noise can be reduced.

The presence of the first coupling connector K1 and the second coupling connector K2 facilitates positioning of the first board C3K and the second board C4K when they are mounted. The presence of the first coupling connector K1 and the second coupling connector K2 facilitates replacement of the first board C3K and the second board C4K.

The presence of the first coupling connector K1 and the second coupling connector K2 makes it possible to directly connect the first inverter circuit C3I and the second inverter circuit C4I with the motor M without wiring. Therefore, the electrical resistance can be reduced, and the assembling can be facilitated. The presence of the first coupling connector K1 and the second coupling connector K2 eliminates the need for wiring. Therefore, it is possible to reduce the poor contact caused by deterioration of wiring and reduce the poor contact caused by entrance of foreign substances.

As viewed from the direction along the rotor output shaft MS (or the central axis L), the first control device C3 and the second control device C4 are arranged in point symmetry. Therefore, the first board C3K and the second board C4K have such a shape that can be arranged in point symmetry. The first circuit C3T provided on the first board C3K and the second circuit C4T provided on the second board C4K are designed to have the same circuit configuration and arranged in the same manner. With this configuration, the same circuit may be used in the first control device C3 and the second control device C4. Therefore, the design work and the manufacturing work can be shortened. Further, the first control device C3 and the second control device C4 are not overlaid one upon the other but disposed flush with each other in the casing C1. Therefore, the steering device W can have a smaller width in the direction of the central axis L.

As shown in FIG. 5, the first board C3K has a projection C3M on which to dispose the sensing unit CS. The second board C4K has a cut-out C4M that fits on the projection C3M. It is also possible that the first board C3K has the same cut-out as the cut-out C4M instead of the projection C3M. In this case, a separate board having a cylindrical shape may be formed to retain the sensing unit CS. Further, it is also possible that the second board C4K has the same projection as the projection C3M of the first board C3K. In this case, the first board C3K and the second board C4K may be assembled together such that the projection C3M of the first board C3K and the projection of the second board C4K overlie one upon the other. Thus, the first control device C3 and the second control device C4 can be designed in completely the same manner. Since the first control device C3 and the second control device C4 are designed in completely the same manner, the costs for design and manufacture can be reduced.

The first control device C3 includes a first projection C3P. As viewed from the direction along the rotor output shaft MS (or the central axis L), the first projection C3P projects outward in the radial direction of the motor M. The second control device C4 includes a second projection C4Q. As viewed from the direction along the rotor output shaft MS, the second projection C4Q projects outward in the radial direction of the motor M. On the bottom surface C1A of the first projection C3P and the bottom surface C1A of the second projection C4Q, there are provided connectors Dn (n is a natural number) for connecting the steering device W with other devices. One or more connectors Dn may be provided.

The connectors Dn project from the bottom surface C1A along the direction of the central axis L. With this configuration, the steering device W includes no connector on the lid portion C2 of the casing C1. Therefore, the steering device W can have a smaller width along the direction of the central axis L.

The connectors Dn provided on the first projection C3P include at least a first power supply connector D1 for supplying electric power to the motor M. The connectors Dn provided on the second projection C4Q include at least a second power supply connector D2 for supplying electric power to the motor M. The first power supply connector D1 is provided on the first projection C3P. The second power supply connector D2 is provided on the second projection C4Q. Therefore, the first power supply connector D1 and the second power supply connector D2 are spaced apart from each other.

The first power supply connector D1 transmits a high voltage current. Since the first power supply connector D1 is provided on the first projection C3P, an excellent heat radiation performance can be attained in the first board C3K near the first power supply connector D1. Likewise, the second power supply connector D2 transmits a high voltage current. Since the second power supply connector D2 is provided on the second projection C4Q, an excellent heat radiation performance can be attained in the second board C4K near the second power supply connector D2.

Since the first power supply connector D1 provided on the first projection C3P and the second power supply connector D2 provided on the second projection C4Q are spaced apart from each other, an excellent heat radiation performance can be attained, and the amount of heat transmitted to the motor M can be reduced.

<Method of Sensing Rotational Angle of Arm>

Next, a description is given of a method of sensing the rotational angle of the arm 30. Between the arm 30 and the motor M, there is provided an angle sensing unit 40 for sensing the rotational angle of the arm. The angle sensing unit 40 is provided, for example, on the first surface side of the fixing member 1F facing the speed reducer 1.

Figure 6:
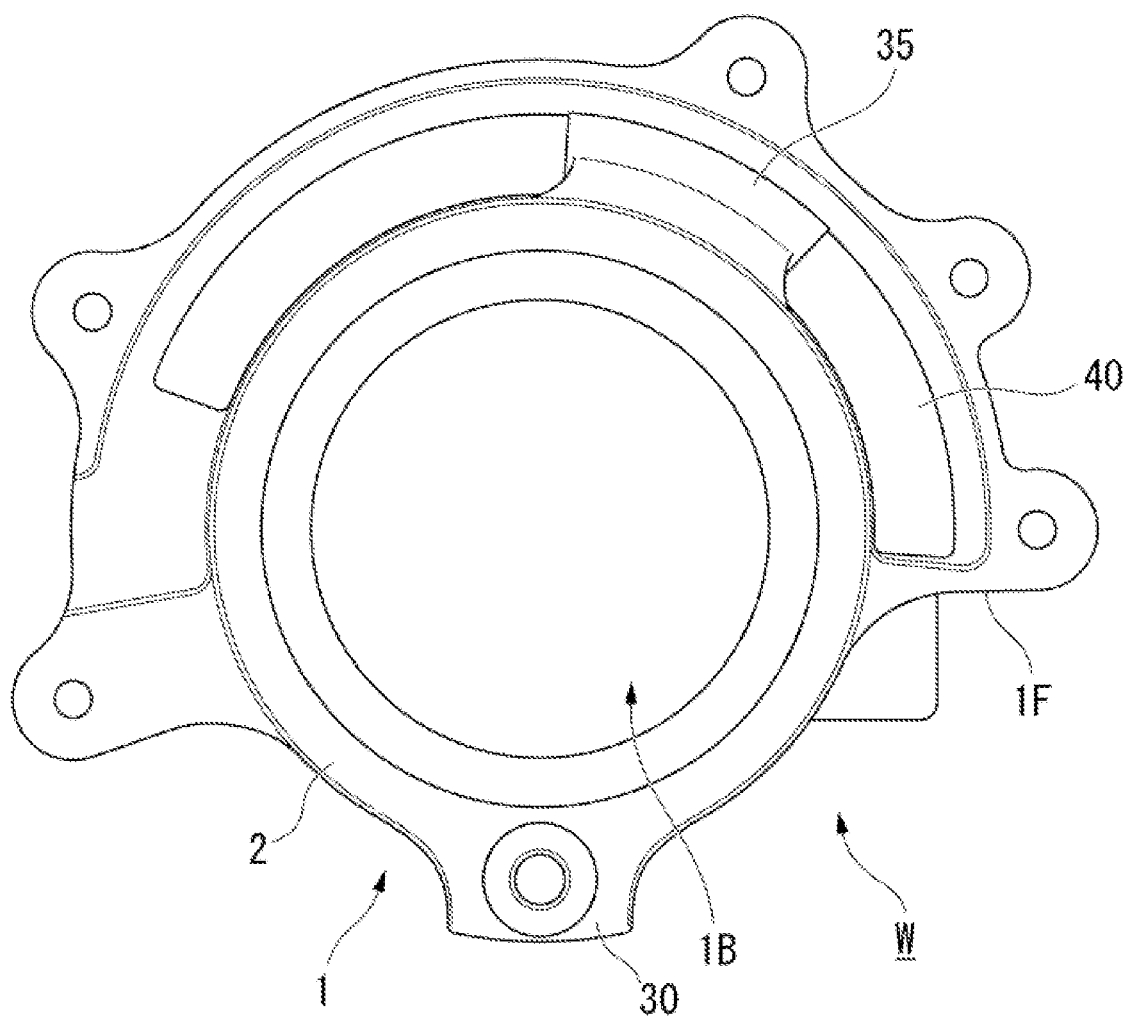
FIG. 6 shows configuration of an angle sensing unit.

As shown in FIG. 6, the angle sensing unit 40 extends, for example, in an arc-like shape along the circumferential direction of the output section 2, as viewed along the central axis L from the second surface 1B side of the speed reducer 1. With this configuration, the steering device W can have a smaller width along the direction of the central axis L than in the configuration in which, for example, the angle sensing unit is provided in the direction of the central axis L. The angle sensing unit 40 is, for example, a magnetic sensor that senses the position of the arm 30 in the circumferential direction based on the variation of the magnetic field varying in accordance with the position of a metal projection 35. Depending on the mounting position of the arm 30, the angle sensing unit 40 may directly sense the position of the arm 30.

With this configuration, the control device C can perform the semi-closed loop control in which the sensing value of the rotational angle of the arm 30 obtained by the angle sensing unit 40 is compared with an instruction signal for the rotational angle of the motor M in accordance with the rotational angle of the arm 30, thereby setting the deflection between the rotational angle of the arm 30 and the instruction signal for the rotational angle of the motor M at zero.

The position and the rotational angle of the arm 30 are previously associated with each other. The control device C calculates the rotational angle of the arm 30 based on the sensed position of the arm 30. The angle sensing unit 40 may be formed of an optical sensor. The angle sensing unit 40 may be formed of any other sensor that can sense the angle of the arm 30. The rotational angle of the arm 30 may be sensed by any other method.

For example, the speed reducer 1 may include a rotation sensing unit 50 (see FIG. 1) for sensing the rotation of the shaft 5S (crankshaft) that receives the rotational force input from the rotor output shaft MS. The reduction ratio between the number of rotations input to the shaft 5S and the number of rotations of the output section 2 output based on the rotations of the gears in the speed reducer 1 is previously calculated based on the reduction ratio of the speed reducer 1. The control device C may calculate the rotational angle of the arm 30 based on the rotation sensing value obtained by the rotation sensing unit 50 for sensing the rotation of the shaft 5S and the reduction ratio of the speed reducer 1 and adjust the rotational angle of the arm 30 based on the calculated value. With this configuration, the rotation sensing unit 50 is provided in the speed reducer 1, and therefore, the steering device W can have a smaller width along the direction of the central axis L. Further, with this configuration, the steering device W can attain higher dustproofness and waterproofness of the rotation sensing unit 50.

As described above, the control device C includes the sensing unit CS (see FIG. 1) for sensing the rotation of the rotor MR, thereby controlling the rotation of the rotor MR. The reduction ratio between the number of rotations input from the rotor MR and the number of rotations of the output section 2 decelerated and output by the speed reducer 1 is previously calculated as a total reduction ratio. The control device C may calculate the rotational angle of the arm 30 based on the sensing value obtained by the sensing unit CS and the total reduction ratio previously calculated and adjust the rotational angle of the arm 30 based on the calculated rotational angle. Further, any sensor may be provided at any position in such a manner that the rotational angle of the arm 30 can be calculated. This configuration eliminates the need for a retrofitted sensor and simplifies the configuration.

The steering device W may either employ an individual method of adjusting the rotational angle of the arm 30 or employ two or more such methods combined together for redundancy.

<Control of Motor M>

Next, a description is given of the control of the motor M by the control device C.

Figure 7:
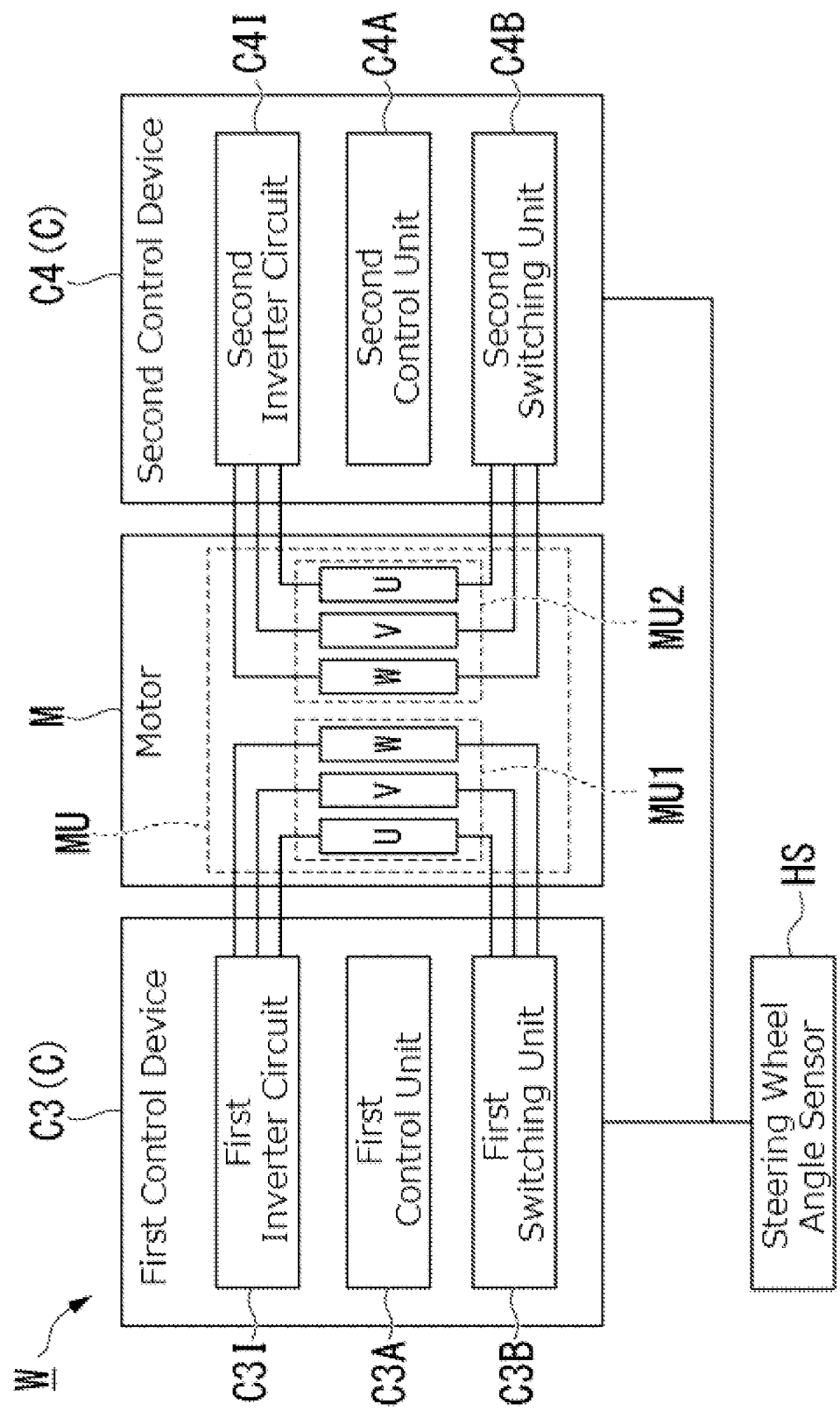
FIG. 7 is a block diagram showing configuration of the steering device of FIG. 1.
Figure 8:
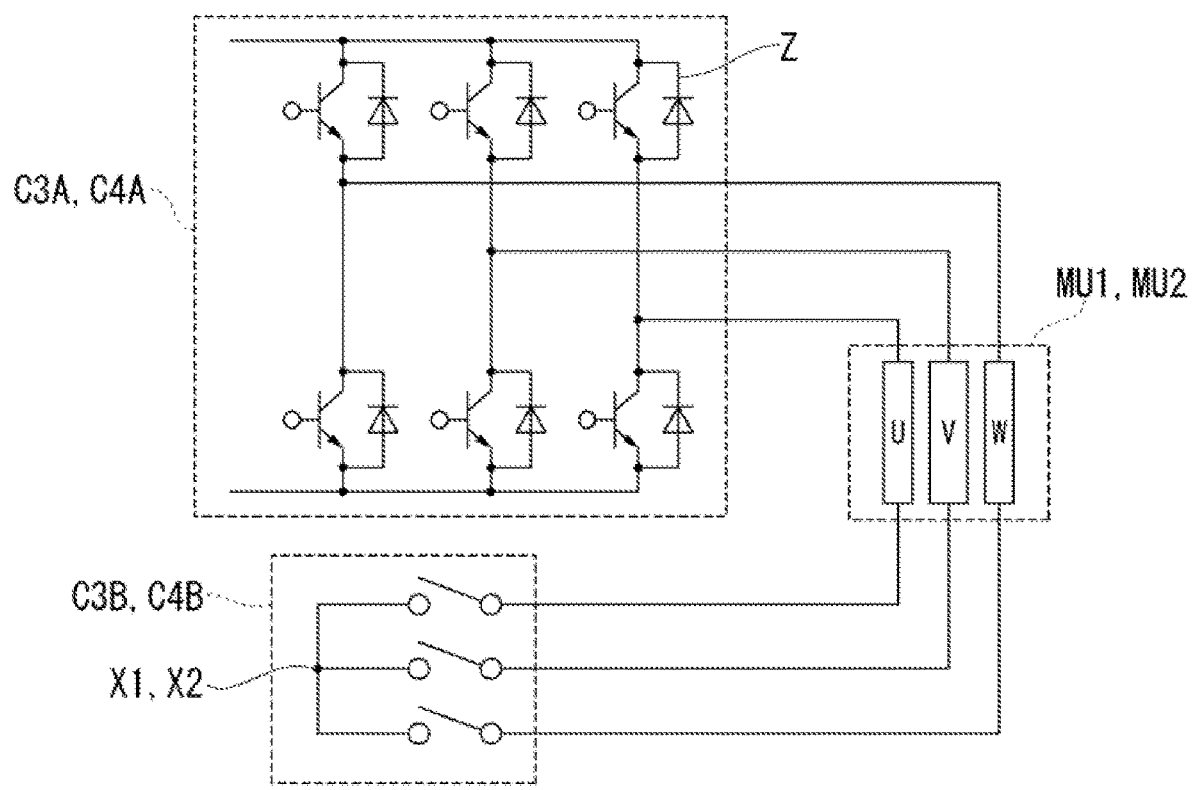
FIG. 8 schematically shows circuit configuration of the control device of FIG. 1.

As shown in FIGS. 7 and 8, the motor M is controlled by the first control device C3 and the second control device C4 based on the sensing value obtained by a steering wheel angle sensor HS provided on the steering unit of the vehicle. The first control device C3 and the second control device C4 control the electric power supplied to the coil unit MU of the motor M to adjust the rotation of the rotor MR. The coil unit MU includes, for example: a first three-phase coil unit MU1 having a three-phase coil controlled by the first control device C3; and a second three-phase coil unit MU2 having a three-phase coil controlled by the second control device C4. In the coil unit MU, the first three-phase coil unit MU1 and the second three-phase coil unit MU2 may be either separate from each other or combined into one three-phase coil unit.

The first control device C3 includes: the first inverter circuit C31 for supplying electric power to the first three-phase coil unit MU1; a first switching unit C3B for controlling the connection at a first connection unit X1 at which the terminals of the first three-phase coil unit MU1 are connected; and a first control unit C3A for controlling the first inverter circuit C31 and the first switching unit C3B. The first inverter circuit C31 is formed of, for example, a plurality of power transistor devices Z. The first switching unit C3B is formed of, for example, a plurality of power transistor devices (not shown).

For example, the first control unit C3A generates pulse current for the PWM (pulse width modulation) control on the timings of switching between On and Off states of each power transistor device Z in the first inverter circuit C31, thereby controlling the first three-phase coil unit MU1. The first control unit C3A may control the first three-phase coil unit MU1 by any control methods other than the PWM control. When, for example, the first control device C3 malfunctions, the first control unit C3A puts the first switching unit C3B into the open state to stop the supply of electric power to the first three-phase coil unit MU1. This ensures the safety of the steering device W in the event of a malfunction.

The second control device C4 includes: the second inverter circuit C4I for supplying electric power to the second three-phase coil unit MU2; a second switching unit C4B for controlling the connection at a second connection unit X2 at which the terminals of the second three-phase coil unit MU2 are connected; and a second control unit C4A for controlling the second inverter circuit C4I and the second switching unit C4B. The second inverter circuit C4I is formed of, for example, a plurality of power transistor devices Z. The second switching unit C4B is formed of, for example, a plurality of power transistor devices (not shown).

For example, the second control unit C4A generates pulse current for the PWM (pulse width modulation) control on the timings of switching between On and Off states of each power transistor device Z in the second inverter circuit C4I, thereby controlling the second three-phase coil unit MU2. The second control unit C4A may control the second three-phase coil unit MU2 by any control methods other than the PWM control. When, for example, the second control device C4 malfunctions, the second control unit C4A puts the second switching unit C4B into the open state to stop the supply of electric power to the second three-phase coil unit MU2. This ensures the safety of the steering device W in the event of a malfunction.

The first control unit C3A controls 50% of the output of the motor M by controlling the first three-phase coil unit MU1. The second control unit C4A controls 50% of the output of the motor M by controlling the second three-phase coil unit MU2. With this configuration, if any one of the first control device C3 and the second control device C4 malfunctions, the steering device W maintains at least a half of its output.

The first control unit C3A may control 100% of the output of the motor M by controlling the first three-phase coil unit MU1. In this case, the second control unit C4A does not control the motor M. The second control unit C4A may control 100% of the output of the motor M by controlling the second three-phase coil unit MU2. In this case, the first control unit C3A does not control the motor M. With this configuration, if any one of the first control device C3 and the second control device C4 malfunctions, the steering device W maintains 100% of its output by switching to the other control device.

In the case where any one of the first control device C3 and the second control device C4 controls the motor M, switching between the first control device C3 and the second control device C4 for controlling the motor M may be performed at predetermined timings such as a preset period or a preset number of times of operation. This configuration distributes the loads in the control of the motor M. The balance between the first control device C3 and the second control device C4 in the control of the motor M may be adjusted to any ratio. The control device C provides the redundancy in the control of the motor M. The control device C makes it possible to designate desirably an efficient power balance in the control of the motor M.

<Operation of Steering Device>

Next, a description is given of an operation of the steering device W.

When a steering wheel is operated in the steering unit of the vehicle, the control device C calculates the rotational angle of the arm 30 in accordance with the operation angle of the steering wheel based on the sensing value obtained by the steering wheel angle sensor HS. Further, the control device C calculates the number of rotations of the motor M in accordance with the rotational angle of the arm 30. The control device C controls the motor M based on the calculation result. In the motor M, the rotation of the rotor MR causes the gear MG to rotate in conjunction with the rotor MR.

The rotation of the gear MG causes the plurality of spur gears 5G meshing with the gear MG to rotate about the axes 5L in conjunction with the gear MG. Thus, the control device C controls the motor M to rotate the rotor MR and input the rotational power to the spur gears 5G. The rotation of each spur gear 5G causes the shaft 5S to rotate in conjunction with the spur gear 5G. Further, the first eccentric cam 5M and the second eccentric cam 5N rotates eccentrically about the axis 5L in conjunction with the rotation of the shaft 5S.

In conjunction with the rotation of the first eccentric cam 5M, the first eccentric gear 6 rotates eccentrically about the central axis L along the inner peripheral surface of the output section 2. Also, in conjunction with the rotation of the second eccentric cam 5N, the second eccentric gear 7 rotates eccentrically about the central axis L along the inner peripheral surface of the output section 2. The rotation of the second eccentric gear 7 is out of phase with the rotation of the first eccentric gear 6 by a half rotation. Further, in conjunction with the rotation of the first eccentric gear 6 and the second eccentric gear 7, the first disc U1 and the second disc U2 rotate simultaneously about the central axis L relative to the output section 2.

The first disc U1 and the second disc U2 are fixed to the fixing member 1F. Therefore, the output section 2 rotates about the central axis L relative to the first disc U1 and second disc U2. The number of rotations of the output section 2 is smaller than that of the shafts 5S.

The rotation of the plurality of spur gears 5 about the axes 5L causes the first eccentric gear 6 and the second eccentric gear 7 to move eccentrically about the axis L in conjunction with the rotation of the plurality of spur gears 5G. At this time, each coupling shaft S moves relatively along the shape of the inner periphery of the associated second through-hole 6K of the first eccentric gear 6, without contacting with the inner periphery of the second through-hole 6K. Likewise, each coupling shaft S moves relatively along the shape of the inner periphery of the associated second through-hole 7K of the second eccentric gear 7, without contacting with the inner periphery of the second through-hole 7K.

The eccentric movement of the first eccentric gear 6 and the second eccentric gear 7 causes the output section 2 to rotate about the central axis L relative to the first disc U1 and the second disc U2. The number of rotations of the output section 2 is smaller than that of the spur gears 5G. Therefore, when a rotation object that receives the rotational output is coupled to the output section 2, it receives a rotational output having a lower speed and a higher torque than the spur gears 5G. Further, the arm 30 rotates about the central axis L in conjunction with the rotation of the output section 2. At this time, the arm 30 rotates with no limitation on its rotation range.

The rotational angle of the arm 30 is sensed by the angle sensing unit 40. Further, the control device C performs the semi-closed loop control in which the sensing value obtained by the angle sensing unit 40 is compared with an instruction signal for the rotational angle of the motor M in accordance with the rotational angle of the arm 30, thereby setting the deflection between the rotational angle of the arm 30 and the instruction signal for the rotational angle of the motor M at zero. In this manner, the rotational angle of the arm 30 can be adjusted accurately.

As described above, the steering device W can realize the steer-by-wire system in which the rotational angle of the arm 30 is adjusted in accordance with the rotational angle in the operation of the steering wheel. In the steering device W, the control device C, the motor M, and the speed reducer 1 are disposed coaxially with the central axis L. Therefore, the steering device W can have a smaller width along the direction of the central axis L, resulting in a smaller size of the steering device W. In the steering device W, the gear MG is integrated with the distal end of the rotor output shaft MS of the motor M. Therefore, the steering device W can have a smaller width along the direction of the central axis L, resulting in a smaller size of the steering device W.

In the steering device W, the arm 30 is provided in the circumferential direction of the output section 2. Therefore, the steering device W can have a smaller width along the direction of the central axis L, resulting in a smaller size of the steering device W. In the steering device W, the control device C is disposed coaxially with the central axis L. Therefore, the steering device W can have a smaller width along the direction of the central axis L, resulting in a smaller size of the steering device W. In the steering device W, the control device C includes the first control device C3 and the second control device C4. This configuration provides the redundancy, whereby the control of the motor M can be continued if any one of the control devices malfunctions.

Modification

Figure 9:
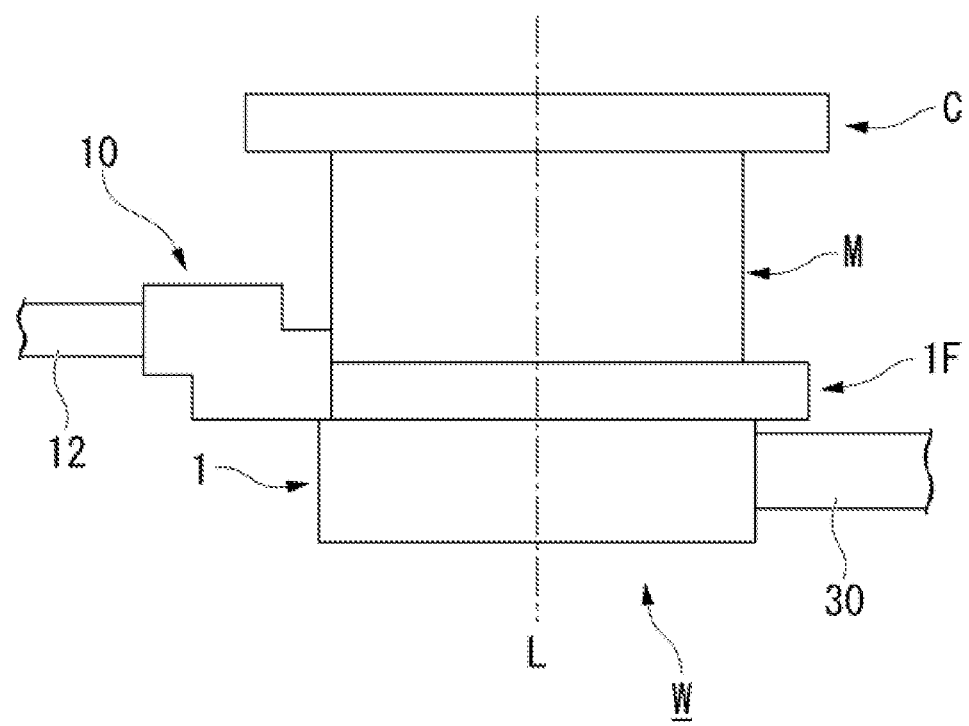
FIG. 9 shows configuration of a steering device according to a modification.

As shown in FIG. 9, the steering device W may be configured as a power steering device that is installed on a steering unit and provides an assisting power for the steering operation. The steering device W may include an input device 10 to which the rotational power of a steering shaft 12 is input. The steering device W including the input device 10 is applied to, for example, a front wheel of a vehicle. Further, the steering device W including the input device 10 may be applied to a commercial truck or a combination vehicle having three or more axles along with other steering devices W not including the input device 10. In this case, the steering device W including the input device 10 may be controlled in conjunction with the other steering devices W not including the input device 10. Further, the steering device W may be applied to a passenger car. Further, the steering device W according to the modification shown in FIG. 9 may be configured as a steer-by-wire device, as is the steering device W according the above embodiment.

The present invention is not limited to the above embodiments but encompasses various modifications of the above embodiments not departing from the purport of the present invention. For example, the steering device W may be used for applications other than the steering unit of a vehicle. The speed reducer 1 is not limited to the above embodiment but may be any speed reducer, such as a harmonic drive speed reducer, that can decelerate the rotational power and output an increased torque.

In the embodiments disclosed above, a member formed of multiple components may be integrated into a single component, or conversely, a member formed of a single component may be divided into multiple components. Irrespective of whether or not the constituent parts are integrated, they are acceptable as long as they are configured to solve the problems.

In the above embodiments, some or all of distributed functions may be integrated together, and conversely, functions integrated together may be partly or entirely distributed. Irrespective of whether or not the functions are integrated or distributed, they are acceptable as long as they are configured to solve the problems.

What is claimed is:

1. A steering device, comprising:
   a speed reducer configured to decelerate a rotational power input from one surface side while increasing a torque of the rotational power and output rotation from a cylindrical output section disposed on another surface side, and the output section is provided with a reduction mechanism inside;
   a motor provided on the one surface side and configured to input the rotational power to the speed reducer; and
   a control device configured to control the motor,
   wherein the motor includes a rotor configured to generate the rotational power,
   wherein the rotor includes a rotor output shaft disposed coaxially with an output axis of the output section,
   wherein the motor inputs the rotational power from one end side of the rotor output shaft to the speed reducer,
   wherein the control device is disposed on the other end side of the rotor output shaft coaxially with the rotor output shaft and includes a sensing unit configured to sense rotation of the rotor,
   wherein the output section has an arm provided thereon that is configured to rotate about the output axis in a circumferential direction of the output section, and
   wherein the arm is disposed to project from the output section in a radial direction orthogonal to the output axis.

2. The steering device of claim 1, wherein the one end side of the rotor output shaft has a gear integrated therewith that serves to input the rotational power to the speed reducer.

3. The steering device of claim 2, wherein the control device includes:
   an inverter circuit configured to generate an electric current for controlling the motor; and
   a coupling connector electrically connecting between the inverter circuit and the motor, and
   wherein the coupling connector is disposed at a position corresponding to the inverter circuit and disposed adjacent to the motor.

4. The steering device of claim 1, wherein the control device includes:
   an inverter circuit configured to generate an electric current for controlling the motor; and
   a coupling connector electrically connecting between the inverter circuit and the motor, and
   wherein the coupling connector is disposed at a position corresponding to the inverter circuit and disposed adjacent to the motor.

5. The steering device of claim 1, wherein the control device includes a first control device and a second control device configured to control the motor, and
   wherein the first control device and the second control device are arranged in point symmetry as viewed from a direction along the rotor output shaft.

6. The steering device of claim 5, wherein each of the first control device and the second control device includes a projection projecting radially outward from the motor as viewed from the direction along the rotor output shaft, and
   wherein a portion of each of the projections facing the motor has a connector provided thereon that is electrically connected with another device.

7. The steering device of claim 6, wherein the connectors include at least power supply connectors configured to supply electric power to the motor, and
   wherein the power supply connectors are provided on the projection of the first control device and the projection of the second control device and are spaced apart from each other.

8. The steering device of claim 1, wherein an angle sensing unit configured to sense a rotational angle of the arm is provided between the arm and the motor.

9. The steering device of claim 8, wherein the angle sensing unit extends along the circumferential direction of the output section.

10. The steering device of claim 1, wherein the speed reducer includes a rotation sensing unit configured to sense rotation of a crankshaft that receives the rotational power input from the rotor output shaft, and
    wherein the control device adjusts a rotational angle of the arm based on a rotation sensing value obtained by the rotation sensing unit and a reduction ratio of the speed reducer.

11. The steering device of claim 1, wherein the control device adjusts a rotational angle of the arm based on a sensing value obtained by the sensing unit and a reduction ratio of the speed reducer.

12. The steering device of claim 1, wherein the control device includes a first control device and a second control device configured to control the motor, and
    wherein the motor includes a first three-phase coil unit controlled by the first control device and a second three-phase coil unit controlled by the second control device.

13. The steering device of claim 12, wherein the first control device includes a first switching unit configured to control connection at a first connection unit at which terminals of the first three-phase coil unit are connected, and
    wherein the second control device includes a second switching unit configured to control connection at a second connection unit at which terminals of the second three-phase coil unit are connected.

14. A steering device, comprising:
    a speed reducer configured to decelerate a rotational power input from one surface side while increasing a torque of the rotational power and output rotation from a cylindrical output section disposed on another surface side, and the output section provided with a reduction mechanism inside;

a motor provided on the one surface side and configured to input the rotational power to the speed reducer;

a control device configured to control the motor; and an arm provided on the output section, wherein the motor includes a rotor configured to generate the rotational power, wherein the rotor includes a rotor output shaft disposed coaxially with an output axis of the output section, wherein the motor inputs the rotational power from one end side of the rotor output shaft to the speed reducer, wherein the control device is disposed on the other end side of the rotor output shaft coaxially with the rotor output shaft and includes a sensing unit configured to sense rotation of the rotor, wherein the arm is configured to rotate about the output axis in a circumferential direction of the output section, wherein the speed reducer includes:

a plurality of spur gears configured to rotate by the rotational power input from the one end side of the rotor output shaft;

a plurality of shafts each coupled to corresponding one of the plurality of spur gears;

a plurality of eccentric cams each formed on corresponding one of the plurality of shafts; and an eccentric gear configured to rotate eccentrically relative to a central axis of the output section in accordance with rotation of the plurality of eccentric cams, wherein the eccentric gear rotates eccentrically about the central axis along an inner peripheral surface of the output section, wherein the output section outputs rotation with a reduced rotational speed compared to that of the plurality of spur gears, and wherein the arm is disposed to project from the output section in a radial direction orthogonal to the output axis.

\* \* \* \* \*